Patented Jan. 20, 1931

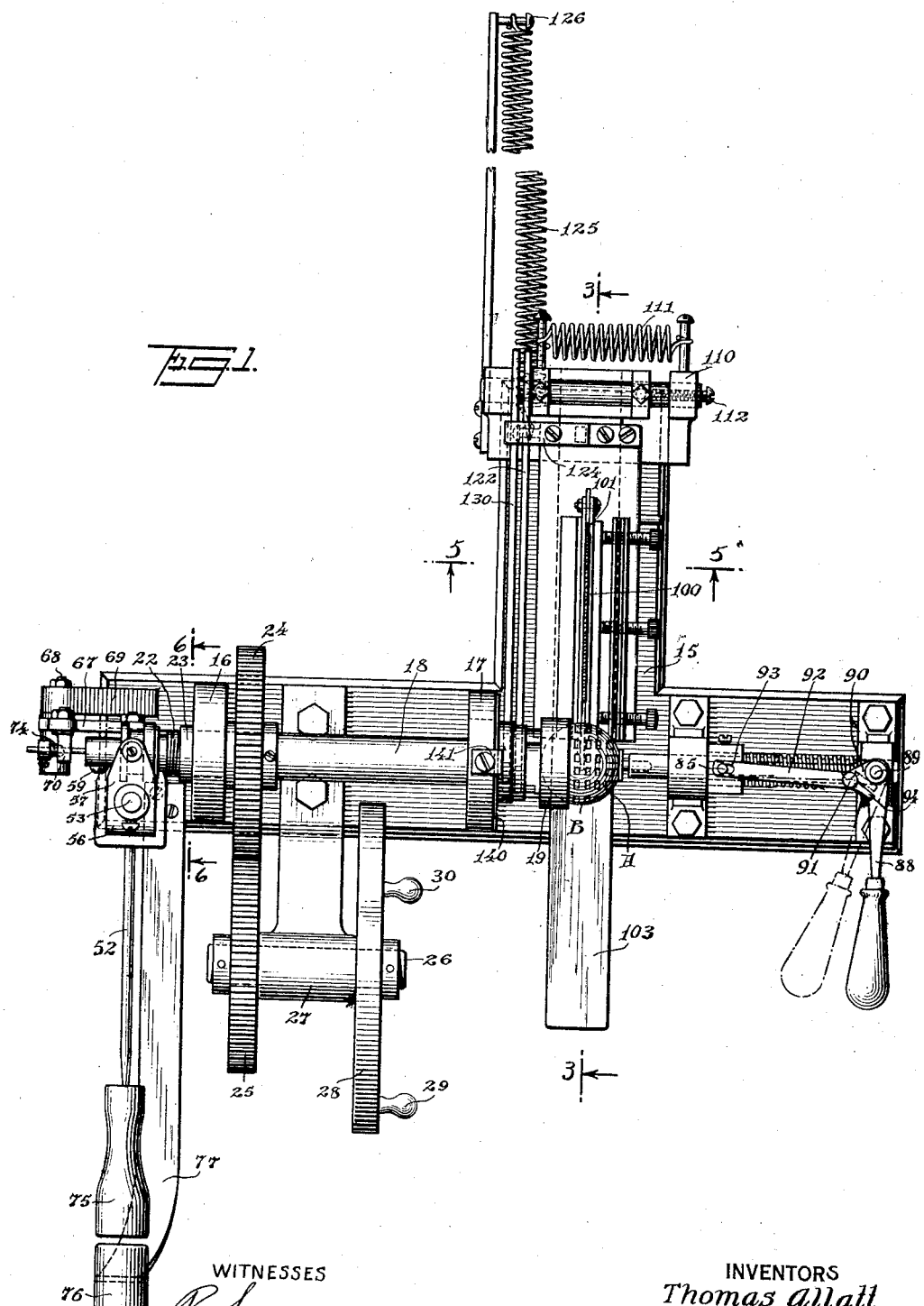

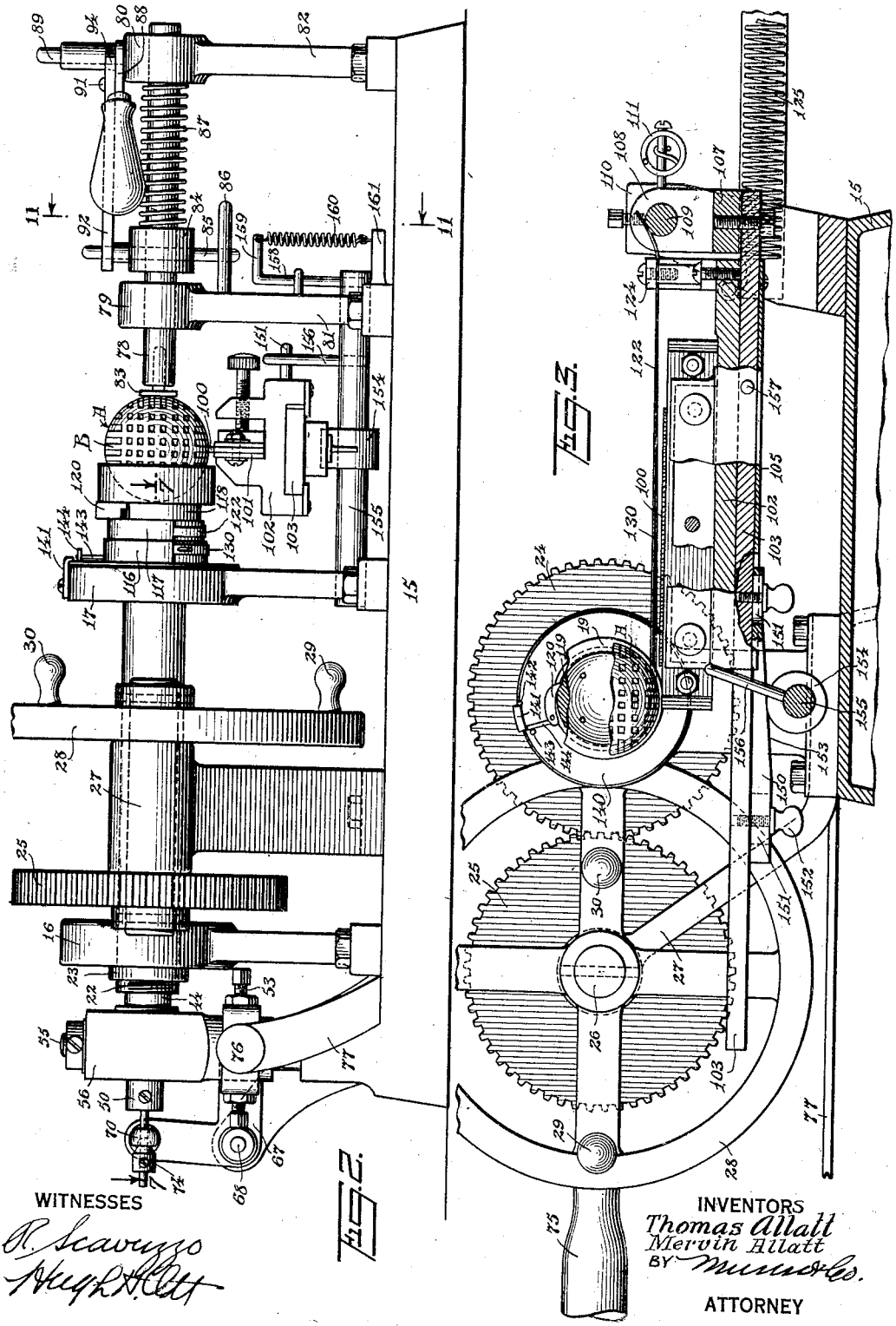

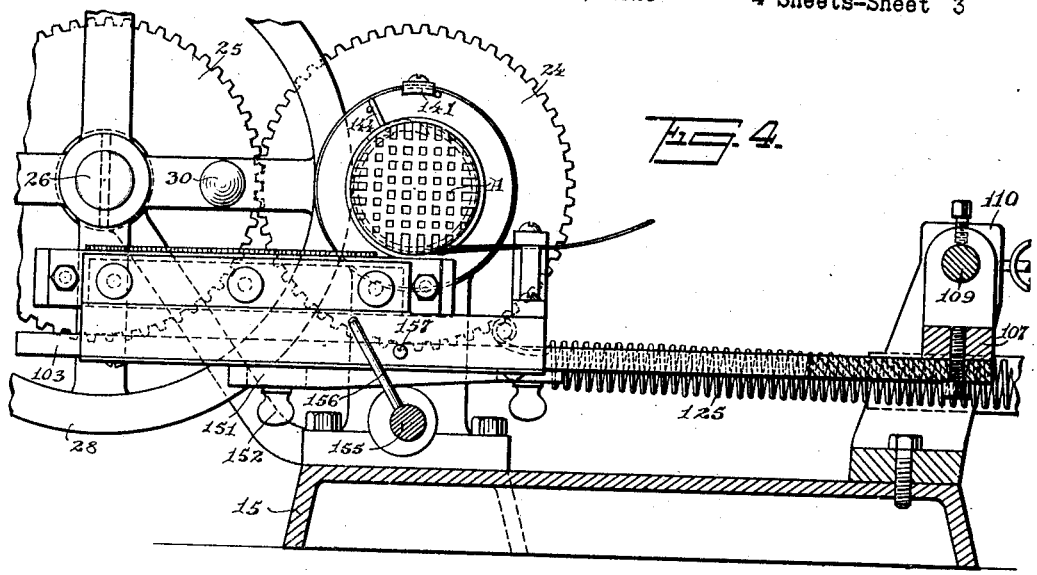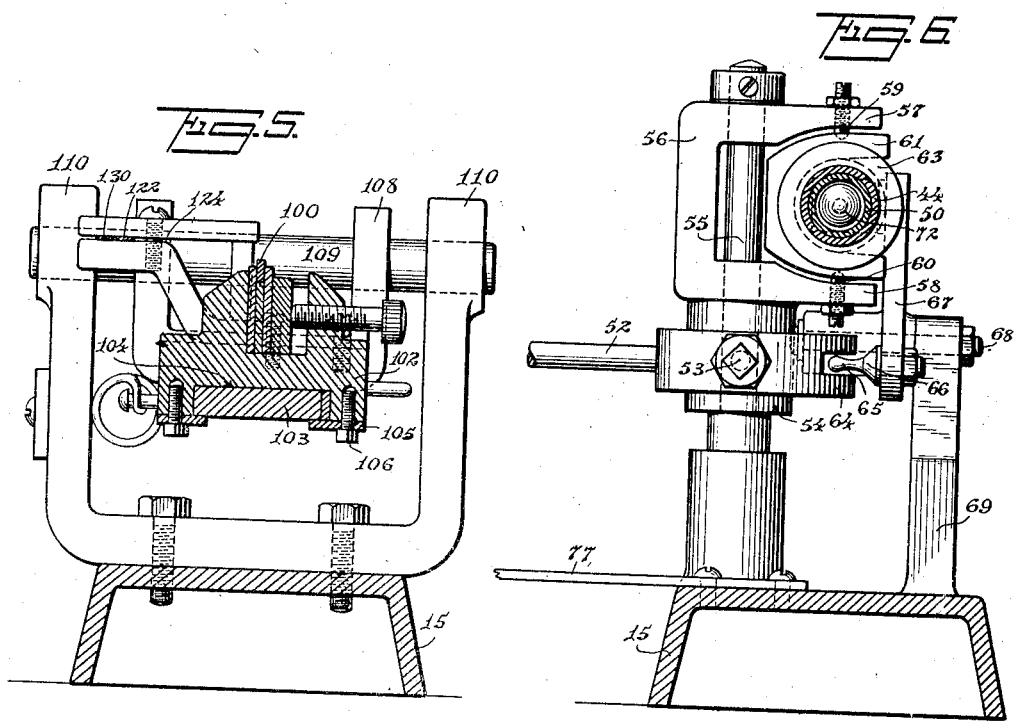

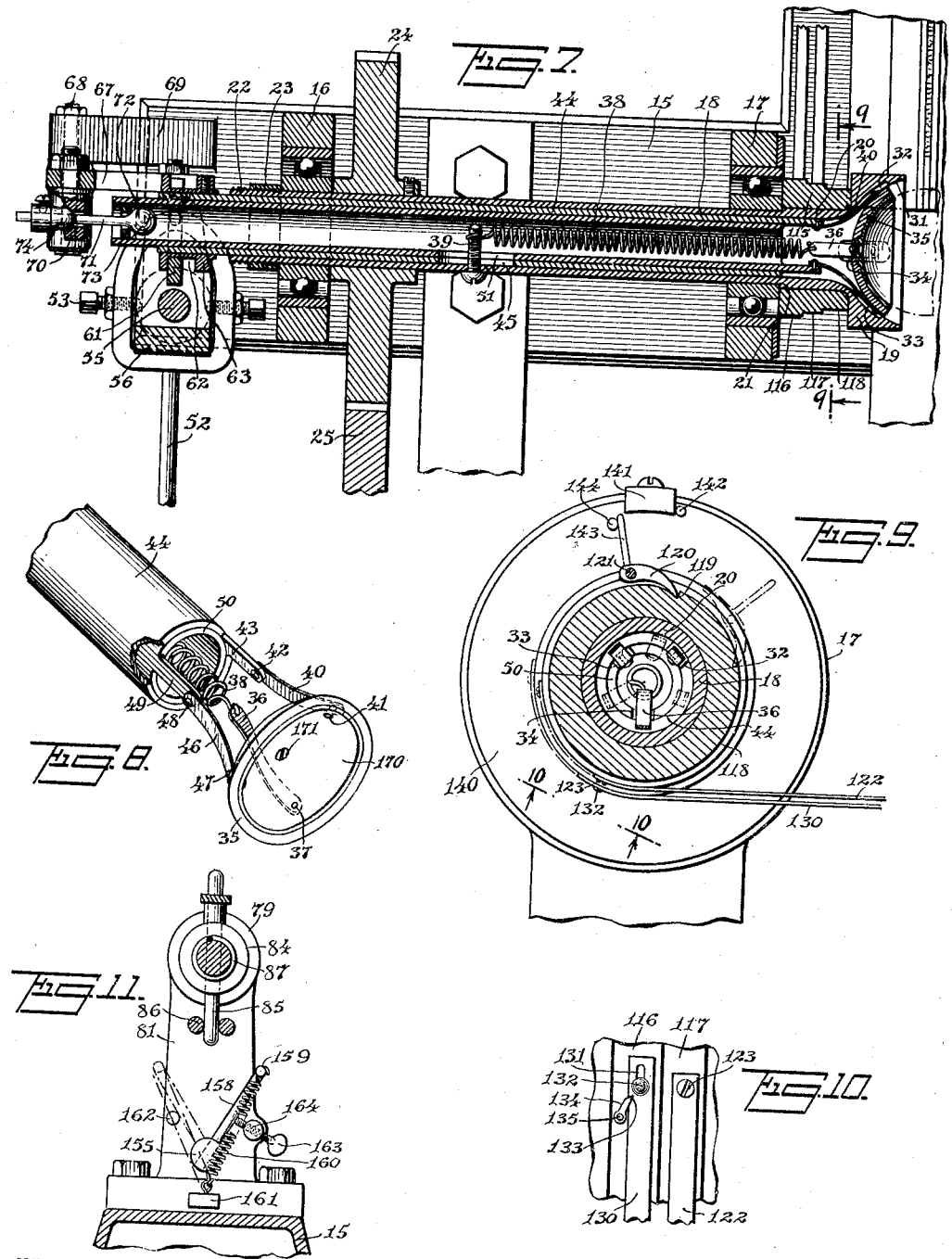

1,789,892

UNITED STATES PATENT OFFICE

THOMAS ALLATT AND MERVIN ALLATT, OF SUMMIT, NEW JERSEY

APPARATUS FOR CENTERING AND MARKING SPHERICAL OBJECTS

Application filed February 2, 1929. Serial No. 337,098.

This invention relates to an apparatus for marking completely around a predetermined circumference of a spherical object, the same being particularly designed for facilitating the marking of a golf ball around its equator.

In view of the fact that practically all golf balls are formed with a tread surface which defines one or more circumferences, considerable difficulty has been encountered in devising a machine or apparatus which will accomplish the lining up of said equators or circumferences with a printing or marking die whereby the printing or marking may be caused to extend completely around the same.

The present invention, therefore, aims to provide an apparatus including a simple and effective means for supporting and expeditiously obtaining an accurate lining up of a predetermined circumference or equator with the printing or marking die so that subsequent reciprocatory movement of the die in a rectilinear path coincident with the turning movement of the ball will effect peripheral engagement of the die with said circumference.

The invention further aims to provide an apparatus for printing or marking completely around a predetermined circumference of a spherical object or ball which includes a die mounted for reciprocatory movement in a rectilinear path, together with means for mounting the ball for turning movement and peripheral engagement with the die, which means also serves to permit of the spinning of the ball and manual rocking of the same in different planes to accurately gauge the alignment of said circumference with the path of movement of the die.

The invention furthermore aims to provide in an apparatus of the character set forth, a ball mounting and rotating means by virtue of which the ball may be rapidly and freely rotated or spun in one direction for the purpose of gauging the accuracy of the alignment of a predetermined circumference thereof with a reciprocatory die and a connection between said ball rotating and mounting means and the die for moving the die coincident with the rotation of the ball when the same is turned in an opposite direction.

The invention further comprehends a ball mounting and rotating means which includes an element for locking the ball against rocking motion after the alignment of its predetermined circumference with the marking die has been obtained.

As a still further object of the invention, the apparatus includes means automatically operable by the initial movement of the die over the circumference of the ball, for decreasing the pressure of the die against the circumference upon the return stroke of the die.

The invention further embodies means for adjusting or regulating the pressure exerted by the die on the circumference of the ball.

As a still further object of the invention, the apparatus embodies means for compensating for variations in the diameter of the ball whereby when the machine is employed for the purpose of marking golf balls, it may be set to either act upon ordinary balls or "floaters" which are of a slightly larger diameter.

Other objects of the invention reside in the comparative simplicity of construction of the apparatus and its mode of use, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a top plan view of the apparatus.

Figure 2 is a front view thereof on an enlarged scale.

Figure 3 is a fragmentary longitudinal sectional view therethrough taken approximately on the line indicated at 3—3 in Figure 1, illustrating the marking die in retracted position.

Figure 4 is a similar view illustrating the marking die projected.

Figure 5 is an enlarged transverse sectional view taken approximately on the line indicated at 5—5 in Figure 1.

Figure 6 is a longitudinal fragmentary sectional view taken approximately on the line indicated at 6—6 in Figure 1.

Figure 7 is a fragmentary horizontal sectional view taken approximately on the line indicated at 7—7 in Figure 2.

Figure 8 is a fragmentary perspective view of the ball rocking means.

Figure 9 is an enlarged longitudinal sectional view taken approximately on the line indicated at 9—9 in Figure 7.

Figure 10 is a fragmentary detail view illustrating the connection between the die shifting means.

Figure 11 is a fragmentary sectional view taken approximately on the line 11—11 of Figure 2.

Referring to the drawings by characters of reference, 15 designates a base provided with transversely spaced upstanding bearings 16 and 17, in which bearings is journaled for rotation a tubular shaft 18. At its inner end the shaft is provided with an enlarged head 19 which extends beyond the bearings 17 and which defines between the head and the bearing a hub portion 20 which is of slightly larger diameter than the diameter of the major portion of the tubular shaft 18 to define a shoulder 21 to take the axial thrust of the shaft in one direction. The opposite or outer end of the shaft 18 is exteriorly threaded as at 22 to receive a nut 23 for taking the thrust of the shaft in the opposite direction. In order to provide means for imparting rotation to the shaft 18, a pinion 24 is secured on the shaft, and said pinion meshes with a gear 25 keyed to a countershaft 26 which is journaled in a bearing bracket 27 anchored to and extending forwardly from the base 15. The countershaft 26 has secured thereto a flywheel 28 provided with eccentric crank handles 29 and 30 at diametrically opposite points and at relatively different distances from the axis of the flywheel. The enlarged head 19 at the inner end of the tubular shaft 18 is provided with a semi-spherical socket 31 which is formed with circumferentially spaced grooves 32, 33 and 34, the grooves 32 and 33 being at approximately a 90° angle with respect to each other and the remaining groove 34 being spaced intermediately thereof. Mounted within the socket 31 for universal rocking movement is a cup shaped ball seat 35 which is a segment of a sphere, the concave side of which is of a diameter coincident to the diameter of the ball or spherical object A which is to be operated upon. An arcuate arm 36 is pivotally attached as at 37 to the convex side of the ball seat 35 and extends outwardly and centrally into the hub portion 20, the groove 34 affording a clearance for the same within the socket 31. The free extremity of the arm 36 is attached to a coiled contractible spring 38, the opposite end of which is anchored to a stud 39 which extends radially inward through the tubular shaft 18. Obviously, the spring functions due to its connection with the ball seat 35, to rock said ball seat in one direction. In order to provide means for rocking the ball seat in another direction, an arm 40 is pivotally attached as at 41 to the convex outer surface of the ball seat at a point approximately 135° from the point of attachment 37 of the arm 36 therewith and the arm 40 is pivotally connected as at 42 to the projecting finger 43 of a sleeve 44, which sleeve extends through the tubular shaft 18 and extends beyond the threaded end 22. It will be apparent that the groove 32 affords a clearance space for the arm 40 within the socket 31. The sleeve 44 is longitudinally slotted as at 45 to accommodate the stud 39 and to allow for axial shifting movement of the sleeve in the shaft 18 while rotating therewith so that the ball seat may be rocked by virtue of the axial movement of said sleeve. An arm 46 is pivotally attached as at 47 to the convex side of the sleeve at a point 90° from the point of attachment 41 of the arm 40 and at approximately 135° from the point of attachment 37 of the arm 36 and said arm 46 is pivotally attached as at 48 to the finger 49 of a second sleeve 50 which is disposed within the outer sleeve. The sleeve 50 is longitudinally slotted at 51 to receive therethrough the stud 39 and to allow for axial shifting movement of the sleeve 50 relative to the sleeve 44 and the tubular shaft 18 so that the ball seat 35 may be rocked in a different direction or plane.

In order to provide a common manipulating means for effecting relative axial movements of the sleeves 44 and 50, a lever 52 is provided which is fulcrumed on horizontal axes 53 to a collar 54, which collar is in turn swiveled on an upstanding bearing post 55. Obviously, this permits of universal swinging movement of the lever 52. The collar is formed with a bifurcated portion 56, the furcations 57 and 58 of which are spaced vertically with respect to each other and are provided with downwardly and upwardly projecting trunnions 59 and 60. The trunnions 59 and 60 carry a shifting fork 61 which engages within the groove 62 of a collar 63 which is secured in turn to the projecting end of the outer sleeve 44 so that lateral movements of the lever 52 will effect axial shifting movements of the sleeve 44. The lever head 64 is provided with a horizontal groove 65 and said groove receives a stud 66 projecting forwardly from one terminal of a bell crank 67 fulcrumed as at 68 on an upstanding bearing bracket 69. The opposite end of the bell crank 67 is provided with a forwardly projecting operated lug 70 through which a stem 71 extends, the said stem being provided with a spherical head 72.

The spherical head 72 projects into the outer end of the inner sleeve 50 and seats against an internal annulus 73. The outer end of the stem which projects through the apertured lug 70 carries an abutment element 74. Under this construction, it is obvious that vertical movements of the lever 52, together with the tension of the spring 38, function to cause the sleeve 50 to move axially. It will also be obvious that combined vertical and horizontal movements of the lever 52 will cause the ball seat 35 to be rocked in different planes. The lever 52 at its free end is provided with a handle 75 and a hand rest element 76 is supported by an arm 77 which is anchored to the base, the hand rest 76 being disposed in axial alignment with the handle 75 when the same is in a neutral position.

In order to provide means for engaging and holding the ball A in the ball seat 35, a spindle 78 is mounted in axial alignment with the tubular shaft 18, and said spindle extends through aligned bearings 79 and 80 on the upper ends bearing standards 81 and 82 which are carried by the base 15. The spindle is formed at its inner end with a swiveled ball engaging head 83 freely rotatable with respect to the spindle. A collar 84 is secured to the spindle by means of a pin 85 which extends vertically through the collar and spindle. The lower end of the pin 85 is arranged between a pair of studs 86 which project outwardly from the standard 81 so that the spindle 78 is retained against rotation while permitted to slide axially in its bearings 79 and 80. A coiled expansion spring 87 surrounds the spindle and is interposed between the collar 84 and the bearing 80 for normally exerting a tension to advance the collar and spindle axially inward to impinge the head 83 against the ball A.

In order to provide means for moving the spindle axially outward to relieve the pressure of the head 83 against the ball A, a lever 88 is provided which is fulcrumed on a vertical axis 89 projecting upwardly from the bearing 80. The lever is provided with a short angularly disposed arm 90 and the free terminal of the arm is pivotally connected at 91 to a link 92. The free end of the link 92 is slotted as at 93 and the slotted end 93 receives the upwardly projecting end of the pin 85. The pivoted end 91 of the link and the arm 90 are so arranged that the shifting movement of the lever 88 from the full line position illustrated in Figure 1 to the dotted line position causes the pivotal point 91 to move to a position in axial alignment with the pin 85 so that the outer end of the slot 93 engages the pin 85 and exerts a proper pressure of the head 83 on the ball A to lock the ball and ball seat against accidental rocking movement. In order to insure proper lining up of the pivotal points 91 and 85, the link 92 is provided with an extension 94 which is adapted to engage the pivotal point 89, as shown in dotted lines in Figure 1. Conversely, when the lever 88 is moved from the dotted line position in Figure 1 to the full line position, the spindle 78 is shifted axially outward to relieve the pressure of the head 83 sufficiently to permit the ball and ball seat to be freely rocked by manipulations of the lever 52. Sufficient pressure of the head 83, however, is maintained against the ball to cause the same to move with the ball seat when rocked and rotated.

The marking die 100 which, as illustrated, is in the nature of a line of type assembled in a chase or form 101, is mounted for reciprocatory movement in a rectilinear path and the chase or form is clamped in a carriage 102 which is slidable on a stationary track bar 103, the carriage being grooved as at 104 on its under side while retaining strips 105 are bolted as at 106 so that the retaining strips partially underlie the track bar to prevent upward movement of the carriage. It is, of course, understood that the path of movement of the marking die 100 is disposed in proper alignment with the circumference or equator B of the ball which is to be marked. In order that the track bar 103 may be vertically adjusted to regulate the pressure of the face of the marking die against the circumference of the ball and to also allow for adjustment of the same to balls of different diameters, the rear end of the track bar 103 is bolted to a supporting member 107, which supporting member is formed with upstanding laterally spaced apertured ears 108, through which a transverse shaft 109 extends. The shaft 109 is in turn journaled in upstanding bearing bracket arms 110 which are carried by the base 15. The shaft 109 is also axially movable in the bearing brackets 110 and said shaft is normally shifted in one direction by a coiled contractile spring 111 while a set screw 112 is employed as a laterally adjustable stop for the shaft and the track bar. By manipulating the screw 112, it is obvious that the lateral adjustment of the type or marking die 100 may be accomplished.

In order to provide means for moving the marking die coincident with the turning of the ball upon rotation of the tubular shaft 18 in one direction, an annular pulley 115 is loosely mounted on the hub portion 20 between the head 19 and the bearing 17. The pulley 115 is provided with peripheral portions 116, 117 and 118 which are of relatively different diameters. The pulley surface 118 which is adjacent the head 19 is formed with a ratchet groove 119, and a gravity pawl 120 mounted on a fulcrum 121 which projects outwardly from the head 19 is designed to cooperate with the ratchet groove 119 when the shaft 18 and its head 19 are turned in a clockwise direction, as viewed in Figure 9.

When the shaft is turned in the opposite direction or a counter-clockwise direction, it is obvious that the ratchet will freely move over the peripheral portion 118 and the ratchet groove 119 so as not to turn the pulley 115 therewith. The peripheral surfaces 116 and 117 are respectively of diameters of the size which equal the diameter of floater golf balls and ordinary golf balls. At a certain point on the circumference of the periphery 117, a flexible band 122 is secured as at 123 and the opposite end of said band is secured by a clamping means 124 to the carriage 102 adjacent its rear end so that turning movement of the shaft 118 in a clockwise direction will cause said band 122 to wind up on the peripheral portion 117 when the gravity pawl 120 engages with the ratchet groove 119. It thus follows that after the equator or circumference B of the ball has been properly lined up with the path of movement of the marking die 100 by turning the shaft 18 in a counter-clockwise direction and manipulating the lever 52, turning of the shaft 18 in a clockwise direction will move the die 100 coincident with the turning of the ball to cause the die to be impressed against the selected circumference or equator B. A coiled contractile spring 125 or its equivalent is anchored at 126 at one end and the opposite end is attached to the carriage to effect the return movement of the carriage and marking die. Obviously, upon return movement, the band 122 is unwound from the peripheral portion 117 to reset the pulley 115 to its normal position. This permits the marking die to be reciprocated a number of times to obtain the desired impression on the ball circumference or equator while insuring a proper registry of the marking die upon each operation.

A second band 130 has one end secured by the clamping means 124 to the carriage 102 while the opposite end is slotted as at 131 to receive therethrough a headed element 132 carried by the peripheral surface 116. One edge of the band adjacent the slotted end 131 is formed with a notch 133 while a pawl 134 is pivoted as at 135 adjacent the element 132 so that the pawl may be swung into and out of engagement with the notch. When the carriage is being moved by the band 122, the pawl 134 is disengaged from the notch 133. When, however, the band 130 is to be used for moving the carriage, the pawl 134 is engaged with the notch 133, and obviously, the band 122 will buckle up slightly during the operation of drawing the carriage forwardly by winding of the band 130 on the peripheral surface 116 of the pulley.

An annular plate 140 is mounted for turning movement with respect to the bearing 17 and the same is retained in flat contact therewith by an angle plate 141. The annular plate 140 is limited in its rotation by a pin 142 which engages the angle plate 141. A radially projecting pintle 143 on the peripheral surface 116 is designed to coact with a laterally projecting pin 144 on the annular plate 140. It thus follows that when the pulley 115 is turned in a clockwise direction as viewed in Figure 9, to wind up the bands 122 and 130 onto their peripheral surfaces, after a complete revolution of the pulley the pintle 143 will engage with the pin 144 to turn the annular disk 140 in a clockwise direction, thereby moving the pin 142 away from its contact with the angle plate 141. Retrograde movement of the pulley 115 will cause the pintle 144 to pick up and move the annular disk 140 therewith until the pin 142 again engages the angle plate 141. Obviously, this permits of more than a complete revolution of the pulley in moving the carriage forwardly while preventing counter-clockwise movement of the pulley beyond a definite point so as to prevent buckling of the bands 122 and 130 when spinning the ball for the truing up operation.

In order to insure a proper and adjustable contact of the face of the marking die with the circumference of the ball, the track bar 103 has supported from its under side a longitudinally shiftable rib 150 which is provided with slots 151 at its opposite ends to receive therethrough set screws 152 anchored in the track bar. The rib 150 is provided with a rearwardly and upwardly inclined under surface 153 which is designed to cooperate with the periphery of a pressure cam or eccentric 154 on a transverse shaft 155 which is journaled in the bearing 17 and the bearing standard 81 respectively. The shaft 155 has its axis disposed parallel to and in a vertical plane with the axis of rotation of the ball. In view of the fact that it is desirable to cause the marking die 100 to exert a greater pressure on its forward movement and a relatively decreased pressure on its return movement, means for accomplishing this consists in providing the cam shaft 155 with a radially projecting arm 156 which is disposed in the path of movement of an actuator stud 157 projecting laterally from the carriage 102. It thus follows that just prior to the carriage reaching the forward extent of its movement and after the marking die has completely marked around the circumference of the ball, the actuator stud 157 will engage the arm 156. The cam shaft 55 is provided with means for positively retaining the same in its rotated positions which consists of a radial retainer arm 158 having a laterally offset terminal 159. A coiled contractile spring 160 is connected with the free end of the offset terminal 159 and with a stationary lug 161 at a point coincident with the axial center of the cam shaft. The retainer arm 150 is limited in its forward swinging movement by a stationary stop pin 162 and in its rearward movement by an adjustable stop means consisting of a set screw 163 threaded through a stud 164. It thus follows that upon forward movement of the carriage when the actuator stud engages and swings the arm 156 slightly beyond the vertical center of the axis of the cam shaft, the spring 160 will cause the retainer arm to be moved against and held in contact with the stationary pin 162. Immediately after the return movement of the carriage, the operator manually shifts the arm 156 in a rearward direction beyond a point in line with the axis of the cam shaft so that the spring will cause the arm to engage with and be held against the adjustable stop screw 163. By adjusting the stop screw 163, the pressure of the marking die against the circumference of the ball on the forward stroke may be regulated while adjustments of the pressure means to compensate for balls of different diameters and to regulate the pressure on the ball upon the return stroke, may be obtained through the longitudinal shifting of the rib 150.

When the smaller balls are to be operated upon, a shim or liner 170 is arranged within the ball seat 35 and held in place by a screw 171, it being understood that the shim or liner 170 is removed when the larger balls are being marked.

In use and operation, the ball A is placed within the ball seat by retracting the head 83 upon swinging of the lever 88 to the right and then permitting the spring 87 to re-engage the head 83 with the ball. The handle 75 of the lever 52 is now moved to its neutral position in alignment with the hand rest 76 and the operator initially lines up the circumference or equator B with the path of movement of the marking die. The operator then turns the flywheel with the handle 30 in a clockwise direction to rotate the tubular shaft 18 rapidly in a counter-clockwise direction. In this manner, the circumference or equator B may be observed and gauged by the operator as to whether it is rotating on a true axis. The operator employs the right hand for turning the handle 30 and with the left hand resting upon the hand rest 76 and the handle 75 grasped by the same hand, the lever 52 may be manipulated to rock the ball in different planes or directions until the circumference or equator B is observed to be accurately turning on a true axis. When this is accomplished, the operator swings the lever 88 to the left in Figure 1 to cause the head 83 to clamp and lock the ball against further rocking movement. The operator then grasps the handle 29 and by turning the flywheel 28 in a counter-clockwise direction causes the tubular shaft 18 and the ball seat and ball to turn in a clockwise direction. When the gravity pawl 120 engages the ratchet groove 119, the band 122 or 130, as the case may be, will be wound up upon the pulley 115 to move the carriage and marking die forwardly coincident with the rotation of the ball, thereby impressing the marking die completely around the circumference or equator B. When the marking die has passed forwardly beyond the ball, the operator may apply ink or dye to the face of the marking die 100 so that when the spring 125 moves the marking die 100 rearwardly, the ink or dye will be applied to the impression. After the ball has been properly marked or printed, the handle 88 is swung to the left in Figure 1 and the ball is removed so that the operation may be repeated on subsequent balls.

What is claimed is:

1. In an apparatus for completely marking around a predetermined circumference of a ball, a marking die mounted for reciprocatory movement in a rectilinear path, means for mounting and turning the ball in one direction independent of the movement of the die for initially truing up the axis of the ball so that the predetermined circumference will align with the die and a connection between the ball turning means and the die for rotating the ball coincident with the movement of the die.

2. In an apparatus for completely marking around a predetermined circumference of a ball including a marking die mounted for reciprocatory movement in a rectilinear path, means for mounting and turning the ball in opposite directions, a connection between the ball turning means and the die operable to move the same in unison when the ball is rotated in one direction and operable to permit of independent rotation of the ball when turned in the opposite direction and means for manually rocking the ball in different planes when turned independent of the die whereby to accurately gauge the truing up of the predetermined circumference of the ball with the path of movement of the die.

3. In an apparatus of the character set forth, means for mounting a ball for rotation and manually controlled means for rocking the same in different planes while rotating to accurately gauge the truing up of a predetermined circumference of said ball.

4. In an apparatus of the character set forth, means for mounting a ball for rotation and manually controlled means for rocking the same in different planes while rotating to accurately gauge the truing up of a predetermined circumference, said means including a ball seat, means frictionally engaging the ball with the seat and means for rocking the ball seat in different directional planes.

5. In an apparatus of the character set forth, means for mounting a ball for rotation and manually controlled means for rocking the same in different planes while rotating to accurately gauge the truing up of a predetermined circumference, said means including a ball seat, means frictionally engaging the ball with the seat and means for rocking the ball seat in different directional planes, said latter means consisting of circumferentially spaced relatively axially movable elements and a tensioned axially extending element circumferentially spaced between the first mentioned elements.

6. In an apparatus of the character set forth, means for mounting a ball for rotation and manually controlled means for rocking the same in different planes while rotating to accurately gauge the truing up of a predetermined circumference, said means including a ball seat, means frictionally engaging the ball with the seat, means for rocking the ball seat in different directional planes, said latter means consisting of circumferentially spaced relatively axially movable elements and a tensioned axially extending element circumferentially spaced between the first mentioned elements and a common manipulating handle for effecting movements of said relatively movable axial elements.

7. In an apparatus for marking around a predetermined circumference of a ball, means for mounting the ball for rotation while permitting of the changing of its axis of rotation during the rotation of the ball, a die mounted for rectilinear movement and rolling contact with the surface of the ball and means constituting a part of the ball mounting means for effecting changes in the axis of rotation of the ball while being rotated to facilitate the truing up of said circumference with the path of movement of the die prior to the marking operation.

8. In an apparatus for marking around a predetermined circumference of a ball, means for mounting the ball for rotation, a die mounted for rectilinear movement and rolling contact with the surface of the ball and means constituting a part of the ball mounting means for facilitating the truing up of said circumference with the path of movement of the die prior to the marking operation, said latter means comprising a manually controlled mechanism for imparting to the ball while rotating, a rocking motion in different planes.

9. In an apparatus for marking around a predetermined circumference of a ball, means for mounting the ball for rotation, a die mounted for rectilinear movement and rolling contact with the surface of the ball and means constituting a part of the ball mounting means for facilitating the truing up of said circumference with the path of movement of the die prior to the marking operation, said latter means comprising a manually controlled mechanism for imparting to the ball while rotating, a rocking motion in different planes, said mechanism including a rotary cup shaped receptacle snugly receiving the ball, tensioned means eccentrically connected with the receptacle for rocking the same at one point and manually controlled means connected eccentrically with and circumferentially spaced from the point of connection of the tensioned means therewith for rocking the receptacle.

10. In an apparatus for marking around a predetermined circumference of a ball, means for mounting the ball for rotation, a die mounted for rectilinear movement and rolling contact with the surface of the ball and means constituting a part of the ball mounting means for facilitating the truing up of said circumference with the path of movement of the die prior to the marking operation, said latter means comprising a manually controlled mechanism for imparting to the ball while rotating, a rocking motion in different planes, said mechanism including a rotary cup shaped receptacle snugly receiving the ball, tensioned means eccentrically connected with the receptacle for rocking the same at one point and manually controlled means connected eccentrically with and circumferentially spaced from the point of connection of the tensioned means therewith for rocking the receptacle and a common universally movable manipulating lever for effecting the rocking of said receptacle at said latter points.

11. In an apparatus of the character set forth, a rotary ball seat, means for frictionally retaining the ball in said seat, means connected with the ball seat at circumferentially spaced points for rocking the same and a common manipulating means universally movable for imparting rocking motion to the ball through said rocking means to cause the ball to rotate truly coincident with a predetermined circumference thereof.

12. In an apparatus of the character set forth, a rotary ball seat, means for frictionally retaining the ball in said seat, means connected with the ball seat at circumferentially spaced points for rocking the same and a common manipulating means universally movable for imparting rocking motion to the ball through said rocking means to cause the ball to rotate truly coincident with a predetermined circumference thereof, in combination with a marking die mounted for rectilinear movement and rolling contact with the predetermined circumference of a ball and means for effecting turning movement of the ball and movement of the marking die in unison.

13. An apparatus for mounting a ball to cause the same to rotate on an axis at a right angle to the plane of a predetermined circumference including a rotary rockable element in which the ball is seated and retained, means for rotating said element and means for rocking said element with the ball therein at a plurality of circumferentially spaced points while rotating.

14. An apparatus for mounting a ball and for causing the same to rotate on an axis at a right angle to a defined circumference comprising a rotary element having a concavity of segmental spherical shape for snugly receiving the ball, means for frictionally holding the ball in said element and means for rocking in different directions said element while rotating until the ball is rotating on the desired axis.

15. An apparatus for mounting a ball and for causing the same to rotate on an axis at a right angle to a defined circumference comprising a rotary element having a concavity of segmental spherical shape for snugly receiving the ball, means for frictionally holding the ball in said element and means for rocking in different directions said element while rotating until the ball is rotating on the desired axis, in combination with a marking die mounted for movement at a tangent to the ball for rolling contact with the defined circumference after the desired axis of rotation of the ball has been obtained.

16. An apparatus for mounting a ball and for causing the same to rotate on an axis at a right angle to a defined circumference comprising a rotary element having a concavity of segmental spherical shape for snugly receiving the ball, means for frictionally holding the ball in said element and means for rocking in different directions said element while rotating until the ball is rotating on the desired axis, in combination with a marking die mounted for movement at a tangent to the ball for rolling contact with the defined circumference after the desired axis of rotation of the ball has been obtained, means for imparting rotation to said element and means of connection between the latter means and the marking die operative to move the marking die coincident with the turning of the ball in one direction.

17. An apparatus for marking completely around a predetermined circumference of a ball including means for mounting the ball for rotation, means for shifting the axis of the ball while rotating to cause the same to rotate on an axis at a right angle to the plane of said predetermined circumference and a marking die mounted for rectilinear movement and rolling contact with said predetermined circumference of the ball after the desired axial rotation of the ball has been obtained.

18. An apparatus for marking completely around a defined circumference of a ball comprising a normally retracted marking die movable in a rectilinear path, rotary means for supporting the ball for rotation and rolling contact with the die when said means is rotated in one direction and means for rocking the ball when said ball supporting means is rotated in the opposite direction for causing the same to turn on an axis at a right angle to said defined circumference whereby said circumference will line up with the path of movement of the marking die.

19. In an apparatus of the character set forth and for the purpose specified, means for mounting a ball for rotation, means for shifting the axis of the ball while rotating in one direction, to cause the same to rotate on an axis at a right angle to the plane of a predetermined circumference, a normally retracted marking die mounted for movement in a rectilinear path tangentially to said circumference and a connection between said marking die and the ball mounting, operable to move the die in unison with the ball when the same is rotated in the opposite direction.

20. In an apparatus of the character set forth and for the purpose specified, means for mounting a ball for rotation, means for shifting the axis of the ball while rotating in one direction, to cause the same to rotate on an axis at a right angle to the plane of a predetermined circumference, a normally retracted marking die mounted for movement in a rectilinear path tangentially to said circumference, a connection between said marking die and the ball mounting, operable to move the die in unison with the ball when the same is rotated in the opposite direction and means for exerting a pressure against the marking die for impinging the same against the circumference of the ball.

21. In an apparatus of the character set forth and for the purpose specified, means for mounting a ball for rotation, means for shifting the axis of the ball while rotating in one direction, to cause the same to rotate on an axis at a right angle to the plane of a predetermined circumference, a normally retracted marking die mounted for movement in a rectilinear path tangentially to said circumference, a connection between said marking die and the ball mounting, operable to move the die in unison with the ball when the same is rotated in the opposite direction and means for exerting a pressure against the marking die for impinging the same against the circumference of the ball, said means being adjustable.

22. In an apparatus of the character set forth, means for mounting a spherical object for rotation and manually controlled means for moving the same while rotating to accurately gauge the truing up of a predetermined circumference of said object.

23. In an apparatus of the character set forth, means for mounting a spherical object for rotation and manually controlled means for moving the same relative to its axis of rotation while rotating for accurately gauging the truing up of a predetermined circumference of said object.

THOMAS ALLATT.
MERVIN ALLATT.